Figure 1:
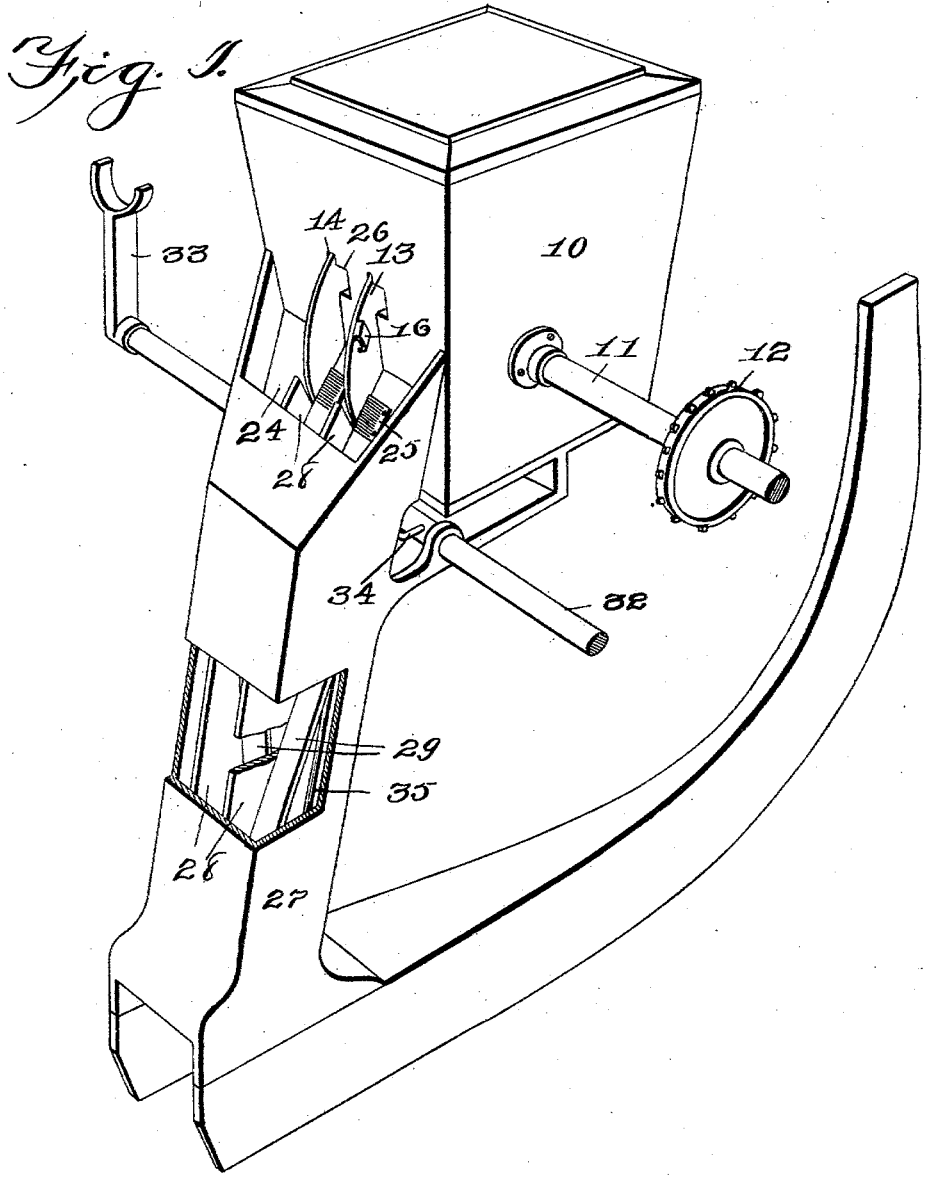

No. 753,119. PATENTED FEB. 23, 1904.
H. S. BUTLER.
SEED PLANTER.
APPLICATION FILED JAN. 16, 1902.
NO MODEL. 3 SHEETS—SHEET 1.

No. 753,119. PATENTED FEB. 23, 1904.
H. S. BUTLER.
SEED PLANTER.
APPLICATION FILED JAN. 16, 1902.
NO MODEL. 3 SHEETS—SHEET 2.
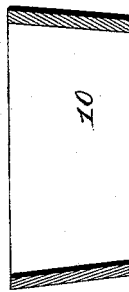

No. 753,119. PATENTED FEB. 23, 1904.
H. S. BUTLER.
SEED PLANTER.
APPLICATION FILED JAN. 16, 1902.
NO MODEL. 3 SHEETS—SHEET 3.
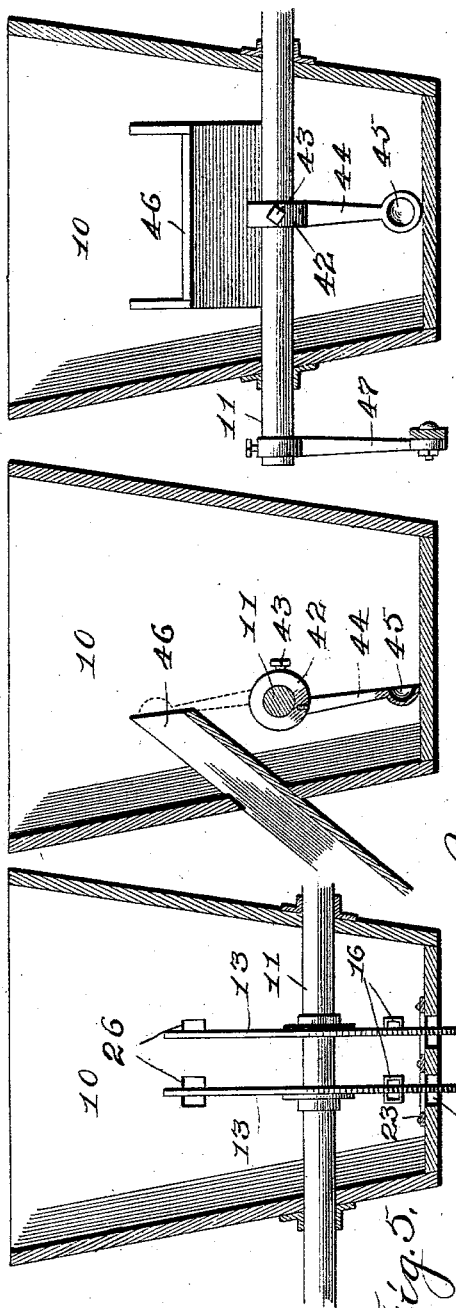
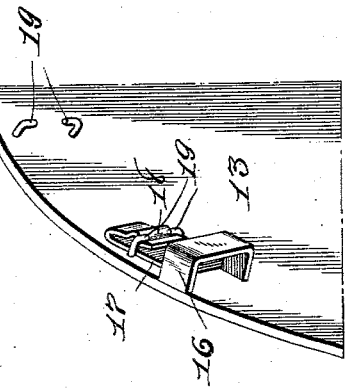
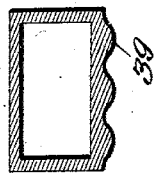
Witnesses: Inventor
H. S. Butler
by Orwig & Kane Attys.

No. 753,119.                                                    Patented February 23, 1904.

UNITED STATES PATENT OFFICE.

HENRY S. BUTLER, OF DES MOINES, IOWA.

SEED-PLANTER.

SPECIFICATION forming part of Letters Patent No. 753,119, dated February 23, 1904.

Application filed January 16, 1902. Serial No. 89,969. (No model.)

*To all whom it may concern:*

Be it known that I, HENRY S. BUTLER, a citizen of the United States, residing at Des Moines, in the county of Polk and State of 5 Iowa, have invented certain new and useful Improvements in Seed-Planters, of which the following is a specification.

The objects of my invention are to provide a seed-planter of simple, durable, and inexpensive construction designed to remove seeds from a single box and discharge them into separate passage-ways, so that when placed in the ground they will be accurately spaced apart from each other.

A further object is to provide means for forming a number of parallel grooves or depressions in the ground-surface to receive the seeds and prevent them from rolling together after passing from the seed-discharging devices.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows in perspective a planter runner and leg and seedbox with my improvements applied thereto and showing also a part of the runner-leg broken away to show the separate seed passage-ways. Fig. 2 shows a vertical sectional view through the planter-leg and seedbox with my improvements applied thereto. Fig. 3 shows a similar view taken on a different line to illustrate the seed-dropping devices in the forward end portion of the planter-leg and also by dotted lines illustrating the position of the second dropper or flirt valve in the rear portion thereof. Fig. 4 shows a horizontal sectional view through the indicated line 4 4 of Fig. 3. Fig. 5 shows a vertical transverse sectional view through the seedbox. Fig. 6 shows a vertical longitudinal sectional view of a seedbox, illustrating a modified form of seed-elevating device therein and by dotted lines showing the seed-elevating device in its raised position. Fig. 7 shows a vertical transverse sectional view of a seedbox with the modified form of seed-raising device illustrated therein. Fig. 8 shows an enlarged detail perspective view of a portion of the seed-elevating disk, showing a detachable seed-pocket in position thereon. Fig. 9 shows an enlarged detail sectional view of a modified form of seed-pocket adjustable as to size. Fig. 10 shows an enlarged detail vertical sectional view of the runner and showing an extensible platform for receiving the seeds and supporting them in the bottom of the runner, said device being adjustable as to length. Fig. 11 shows a vertical transverse sectional view through the runner, illustrating the ribs at the bottom thereof.

Referring to the accompanying drawings, I have used the reference-numeral 10 to indicate the seedbox, which may be of any ordinary construction. Extended transversely through the seedbox is a shaft 11, on one end of which is a sprocket-wheel 12, by which the shaft 11 may be rotated. Mounted upon the shaft within the interior of the seedbox is one or more flat disks 13. These disks project through slots 14 in the rear face of the seedbox and through slots 15 in the bottom thereof, so that the peripheries of the disks project through the box for a portion of their movement. Upon each disk I have provided a number of seed-pockets 16, arranged near the periphery of the disk. These pockets, as clearly illustrated in Fig. 8, may be made detachable by providing a spring-metal extension 17 thereon, having a shoulder at 18, which shoulder is designed to pass under the ends of the hooks 19, which hooks are fixed to the side of the disk near its periphery. Any desirable number of hooks 19 may be provided, and obviously one of the pockets may be readily and quickly detached from the disk by simply pressing the spring 17 downwardly, so that the shoulder 18 may pass under the hooks 19. These pockets 16 may be placed on one or both sides of each disk, as illustrated in Fig. 5. In Fig. 9 I have shown a means whereby the capacity of the pocket may be adjusted, such means comprising a substantially L-shaped partition 20, one edge of which rests upon the bottom of the pocket 16 and the other overlaps the top thereof. A set-screw 21 is seated in one side of the pocket, and its other end is rotatably connected with the L-shaped partition. Hence an adjustment of the screw 21 will move the L-shaped partition to and from the side of the pocket 16 in which the screw is seated, thereby adjusting the capacity of the pocket.

As shown in Fig. 5 of the drawings, there must be openings 22 in the bottom of the seed-box to permit the passage of the pockets 16. I have provided means whereby the seeds in the box are prevented from passing downwardly through these openings, as follows: On the interior of the box I have secured to the bottom thereof a series of brushes 23, the teeth or bristles of which project across the opening 22 and engage the sides of the disk 13, and when the pockets 16 strike the teeth or bristles they will elevate them and permit the pockets to pass upwardly, and as soon as the pockets have passed upwardly the teeth or bristles will spring downwardly into position to cover the opening. At the rear of the seedbox is an inclined chute 24, which chute is slotted to permit the passage of the disks through it, and in said chute 24 are openings to permit the passage of the pockets 16, and on top of the chute are the brushes 25 to cover these openings, said brushes being substantially the same as the brushes hereinbefore described. In the rear of the seedbox are openings 26 to pass the pockets 16; but no brushes are necessary to cover these openings.

From the foregoing description it is obvious that upon the rotation of the shaft 11 the disks 13 are turned with it, and as the pockets 16 on the disks pass upwardly through the sides in the box each pocket will be filled with seed. I preferably provide pockets of such size as to admit only one seed, and if I desire to plant more seeds I provide additional pockets. The seeds will be elevated in the pockets until they reach a point where the pocket is wholly or partially inverted, whereupon the seed must drop from the pocket. At this point I have provided the inclined chute 24, and obviously the seeds will drop upon this chute outside of the seedbox, and from thence to a point of discharge, as will hereinafter appear.

The reference-numeral 27 indicates a planter-leg which is hollow. This planter-leg is arranged directly beneath the inclined chute 24, so that the seeds passing from the chute will enter the hollow leg. Within the planter-leg are two vertical longitudinal partitions 28, thus dividing the leg into three compartments. In each of these compartments is a vertical transverse partition 29. The two outer partitions 29 preferably lead from the top of the planter-leg downwardly and to the forward end portion of the planter-leg near its bottom, while the central partition 29 leads from the forward end of the planter-leg at its top to the rear end of the planter-leg at its bottom. Hence all of the seeds carried upon the pockets at the outer sides of the disks will fall into the two outer compartments of the planter-leg, while all of the seeds carried upon the pockets on the inner faces of the disks will enter the central compartment of the planter-leg, and thus the seeds will be maintained in separate passage-ways or compartments and and cannot become commingled. I have provided means for retaining the seeds passed through the planter-leg at the bottom of the planter-leg for a certain predetermined length of time until such time as it is desired to drop the seeds, and when the seeds are thus dropped to drop them at the same time, as follows: Within the heel of the runner, directly beneath each of the passage-ways through the planter-leg, is an inclined partition 30, the two partitions in the outer portions of the runner-heel being in advance of the one in the central portion, as clearly illustrated in Figs. 2 and 3. Pivotally supported above each of the inclined partitions 30 is a hollow second drop or flirt valve 31 of ordinary construction. The lower end of this second drop or flirt valve rests on the inclined partition 30, and the upper end is so positioned as to receive the seeds passing through the compartment in the planter-leg. Hence in order to drop the seeds it is only necessary to move the second drop or flirt valve 31 rearwardly beyond the end of the partition 30. This is accomplished as follows: Mounted near the top of the planter-leg is a shaft 32, having at one end a fork 33, which fork is designed to engage the projections on a knotted check-row wire stretched across the field, or the fork 33 may be operated in any other way. When said fork is operated, the shaft 32 will be rocked, and fixed to the shaft 32 is a laterally-projecting arm 34, and pivoted to the arm 34 is a series of rods 35, each of which is pivoted at its lower end to one of the second dropper or flirt valves 31. Hence when the shaft 32 is rocked by means of a check-row wire or in any other way all of the second drop or flirt valves will be actuated to discharge their contents at the same time. I have provided means whereby these second drop or flirt valves may be made to discharge their contents at different points, as follows: Referring to Fig. 10 of the drawings, I have shown on top of the partition 30 a plate 36, having a slot 37 and adjustably supported on the partition 30 by means of a bolt 38, passed through said slot and through the partition 30. Hence the rear end of the plate 36 may be made to project more or less beyond the rear end of the partition 30, and the dropper will discharge its contents beyond the rear end of the plate 36 wherever said plate may be placed. By this means it is obvious that when the seeds enter the ground they will be spaced apart and, further, that the distances which the seeds are spaced may be varied at will by the adjustment of the plate 36.

From the foregoing description it will be seen that the seeds in the outer compartment of the planter-leg will be discharged therefrom at a point in front of the seeds in the central compartment of the planter-leg, and I have also provided means whereby the seeds thus discharged into the ground will be prevented from rolling laterally, as follows: Upon the under surface of the runner I have provided three longitudinal ribs 39 of such size that as the runner advances over the ground it will form in the ground-surface three longitudinal grooves, one of which will be arranged directly beneath each compartment of the planter-leg, so that the seeds discharged into these grooves will not roll laterally.

In practical use it is obvious that my improvements may be attached to any ordinary planting-machine, the preferred forms of my invention being particularly designed for use in connection with check-row corn-planters. Upon advance of the corn-planter over the field the sprocket-wheel 12 is rotated, and this obviously will result in each of the pockets 16 engaging one grain of corn or other seed and carrying it to a point of discharge at the rear of the seedbox. From this point the seed will drop upon the chute 24, and the operator may see the seed as it drops. Where two or more disks 13 are provided for each box, a planter-leg is provided with partitions, and these partitions serve to hold the seeds separated until they enter the ground. The brushes 23 and 25 serve to prevent the grain from passing through the openings in the seedbox provided for the passage of the seed-pockets. I preferably employ two disks 13, and on the outer surface of each disk is placed one seed-pocket and on the inner surface of one of the disks is placed one seed-pocket, so that upon each revolution of the shaft 11 three seeds will be engaged and elevated and discharged into the planter-leg. If it is desired to plant more seeds during a single revolution of the sprocket-wheel 12, it is only necessary to add more pockets to the disks, as clearly shown in Fig. 8. The seeds thus discharged through the planter-leg will be supported upon the three platforms or partitions 30, and when the shaft 32 is actuated the seeds on these three platforms will be dropped at the same time, those on the outer platform being dropped in advance of those on the inner or central platform. These platforms may be adjusted as to length, as shown in Fig. 10 of the drawings. Hence the seeds may be spaced apart at any desirable distances. The ribs 39 on the bottom of the runner provide grooves into which seeds will drop, so that the seeds are not liable to roll laterally, for they strike the ground and will be spaced apart laterally at a distance corresponding to the distance between the grooves formed in the ground.

Having thus described my invention, what I claim, and desire to secure by Letters Patent of the United States therefor, is—

1. In a seed-planter, the combination of a seedbox having a slot in its bottom and back and also having an opening in the bottom beside the slot, a chute extending downwardly and rearwardly from the rear of the box, said chute also having a slot and an opening, and a disk rotatably mounted within the seedbox and passing through the slot in the back and bottom of the box and the slot in the chute, pockets on the sides of the disk near its periphery to pass through the said openings, and brushes covering the openings in the bottom of the seedbox and in the said chute, for the purposes stated.

2. In a seed-planter, a planter-leg having a number of independent vertically-arranged compartments open at the top and bottom of the leg, means for independently supporting seeds in each compartment at the bottom of the planter-leg, and means for simultaneously dropping all of the seeds thus supported.

3. In a seed-planter, the combination of a planter-leg having a number of vertical, longitudinal partitions, and a number of horizontal partitions 30 at the bottom of the planter-leg, a hollow seed-dropper 31 above each of the partitions 30, and means for simultaneously operating all of said seed-droppers.

4. In a seed-planter, the combination of a planter-leg having a number of vertical longitudinal partitions and a number of horizontal partitions 30 at the bottom of the planter-leg, a hollow seed-dropper 31 above each of the partitions 30, means for simultaneously operating said seed-droppers and an adjustable plate 36 at the top of each of the partitions 30.

5. In a seed-planter, a planter-leg having separate compartments arranged side by side to receive seeds and to conduct them to the bottom of the leg and maintain them separated from each other, a runner at the bottom of said leg having on its under surface a number of longitudinal ribs, said compartments in the leg discharging through the runner at points between the ribs.

Des Moines, Iowa, November 21, 1901.

HENRY S. BUTLER.

Witnesses:
J. RALPH ORWIG,
THOMAS G. ORWIG.